(12) United States Patent
Urmanov et al.

(10) Patent No.: US 11,409,770 B2
(45) Date of Patent: *Aug. 9, 2022

(54) MULTI-DISTANCE SIMILARITY ANALYSIS WITH TRI-POINT ARBITRATION

(71) Applicant: ORACLE INTERNATIONAL CORPORATION, Redwood Shores, CA (US)

(72) Inventors: Aleksey M. Urmanov, San Diego, CA (US); Alan Paul Wood, San Jose, CA (US); Anton A. Bougaev, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1036 days.

This patent is subject to a terminal disclaimer.

(21) Appl. No.: 16/059,336

(22) Filed: Aug. 9, 2018

(65) Prior Publication Data

US 2018/0349470 A1 Dec. 6, 2018

Related U.S. Application Data

(63) Continuation-in-part of application No. 14/669,729, filed on Mar. 26, 2015, now abandoned.

(51) Int. Cl.
*G06F 16/00* (2019.01)
*G06F 16/28* (2019.01)
(Continued)

(52) U.S. Cl.
CPC ............ *G06F 16/285* (2019.01); *G06F 16/29* (2019.01); *G06F 17/10* (2013.01); *G06F 17/15* (2013.01);
(Continued)

(58) Field of Classification Search
None
See application file for complete search history.

(56) References Cited

U.S. PATENT DOCUMENTS

| 7,792,770 B1 * | 9/2010 | Phoha ................. G06K 9/6284 706/45 |
| 2008/0010304 A1 | 1/2008 | Vempala et al. |

(Continued)

OTHER PUBLICATIONS

On using multiple classifier systems for Session Initiation Protocol (SIP) anomaly detection, Mehta et al., IEEE ICC 2012—Communication and Information Systems Security Symposium.*

(Continued)

*Primary Examiner* — David J Stoltenberg
(74) *Attorney, Agent, or Firm* — Kraguljac Law Group, LLC (57) ABSTRACT

Systems, methods, and other embodiments associated with multi-distance tri-point arbitration are described. In one embodiment, a method includes using a K different distance functions, calculating K per-distance tri-point arbitration similarities between a pair of data points with respect to an arbiter point. A multi-distance tri-point arbitration similarity S between the data points is calculated by determining that the data points are similar when a dominating number of the K per-distance tri-point arbitration similarities indicate that the data points are similar; and determining that the data points are dissimilar when a dominating number of the K per-distance tri-point arbitration similarities indicate that the data points are dissimilar. The multi-distance tri-point arbitration similarity is associated with the data points for use in future processing.

20 Claims, 5 Drawing Sheets

(51) Int. Cl.
    *G06F 17/15*     (2006.01)
    *G06F 17/16*     (2006.01)
    *G06N 20/00*     (2019.01)
    *G06K 9/00*     (2022.01)
    *G06F 17/10*     (2006.01)
    *G06K 9/62*     (2022.01)
    *G06F 16/29*     (2019.01)
    *G06N 5/02*     (2006.01)

(52) U.S. Cl.
    CPC ......... *G06F 17/16* (2013.01); *G06K 9/00523* (2013.01); *G06K 9/00536* (2013.01); *G06K 9/6215* (2013.01); *G06N 5/025* (2013.01); *G06N 20/00* (2019.01)

(56) References Cited

U.S. PATENT DOCUMENTS

2008/0256230 A1   10/2008   Handley
2008/0275862 A1   11/2008   Liu et al.
2012/0195429 A1*   8/2012   Balissat .............. H04L 63/0209
                                                  380/255
2012/0254183 A1   10/2012   Ailon et al.
2012/0284793 A1*   11/2012   Steinbrecher ....... H04L 63/1425
                                                  709/224

OTHER PUBLICATIONS

K-Nearest-Neighbours with a Novel Similarity Measure for Intrusion Detection, Ma et al., 978-1-4799-1568-2/13 c 2013 IEEE.*
A Survey of Distance and Similarity Measures Used Within Network Intrusion Anomaly Detection, Weller-Fahy et al., IEEE Communication Surveys & Tutorials, vol. 17, No. 1, First Quarter 2015.*
U.S. Non-Final Office Action dated Apr. 29, 2020 from co-pending U.S. Appl. No. 16/037,116, filed Jul. 17, 2018.

* cited by examiner

Figure 1

$$S(x_1,x_2|a) = \frac{\min\{\rho(x_1,a), \rho(x_2,a)\} - \rho(x_1, x_2)}{\max\{\rho(x_1, x_2), \min\{\rho(x_1,a), \rho(x_2,a)\}\}}$$

MULTI-DISTANCE SIMILARITY ANALYSIS WITH TRI-POINT ARBITRATION

CROSS REFERENCE TO RELATED APPLICATIONS

This application claims priority to and is a continuation-in-part of U.S. patent application Ser. No. 14/669,729, filed on Mar. 26, 2015 and titled "MULTI-DISTANCE SIMILARITY ANALYSIS WITH TRI-POINT ARBITRATION", which is incorporated herein by reference.

BACKGROUND

Data mining and decision support technologies use machine learning to identify patterns in data sets. Machine learning techniques include data classification, data clustering, pattern recognition, and information retrieval. Technology areas that utilize machine learning include merchandise mark-down services in retail applications, clinician diagnosis and treatment plan assistance based on similar patients' characteristics, and general purpose data mining. The various machine learning techniques rely, at their most basic level, on a distance between pairs of data points in a set of data as a measure of similarity or dissimilarity. Machine learning has become one of the most popular data analysis and decision making support tool in recent years. A wide variety of data analysis software packages incorporate machine learning to discover patterns in large quantities of data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The basic building block of traditional similarity analysis in machine learning and data mining is categorizing data and their attributes into known and well-defined domains and identifying appropriate relations for handling the data and their attributes. For example, similarity analysis includes specifying equivalence, similarity, partial order relations, and so on. In trivial cases when all attributes are numeric and represented by real numbers, comparing data point attributes is done by using the standard less-than, less-than-or-equal, more-than, and more-than-or-equal relations, and comparing points by computing distances (e.g., Euclidean) between the two points. In this case, the distance between two data points serves as the measure of similarity between the data points. If the distance is small, the points are deemed similar. If the distance is large, the points are deemed dissimilar.

A matrix of pair-wise distances between all data points in a data set is a standard similarity metric that is input to a variety of data mining and machine learning tools for clustering, classification, pattern recognition, and information retrieval. Euclidean distance is one possible distance between data points for use in the pair-wise matrix. A variety of other distance-based measures may be used depending on the specific domain of the data set. However, the distance based measures used in traditional machine learning are understandably all based on two data points.

One of the deficiencies of the traditional two data point distance approach to similarity analysis is the subjectivity that is introduced into the analysis by an outside analyst. An outside analyst determines the threshold on distances that indicate similarity. This leads to non-unique outcomes which depend on the analyst's subjectivity in threshold selection.

Traditionally, a determination as to what constitutes "similarity" between data points in a data set is made by an analyst outside the data set. For example, a doctor searching for patients in a data set having "similar" age to a given patient specifies an age range in her query that, in her opinion, will retrieve patients with a similar age. However, the age range that actually represents "similar" ages depends upon the data set itself. If the data set contains patients that are all very similar in age to the given patient, the query may be over-selective, returning too many patients to effectively analyze. If the data set contains patients that have ages that have a wide variety of ages, the query may be under-selective, missing the most similar patients in the data set.

Another deficiency in the traditional two point distance approach to similarity analysis is the conceptual difficulty of combining attributes of different types into an overall similarity of objects. The patient age example refers to a data point with a single, numerical, attribute. Most machine learning is performed on data points that have hundreds of attributes, with possibly non-numerical values. Note that the analyst will introduce their own bias in each dimension, possibly missing data points that are actually similar to a target data point. Some pairs of points may be close in distance for a subset of attributes of one type and far apart in distance for another subset of attribute types. Thus, the analyst may miss data points that are similar to the target data point for reasons that are as yet unappreciated by the analyst. Proper selection of the similarity metric is fundamental to the performance of clustering, classification, and pattern recognition methods used to make inferences about a data set.

The proper selection of the distance function used to determine the similarity metric plays a central role in similarity analysis. There are hundreds of distance functions that have been proposed and used in the analysis of various data types. For example, there are at least seventy-six different distance functions that can be used for simple binary data represented by sequences of 0's and 1's. Selecting the "right" one of these different distance functions for a given dataset places a great deal of burden on the analyst. In addition, it is likely that there will be differences in the results obtained with different distance functions, which will difficult to understand. The difficulty in selecting the proper distance function is even more difficult in the analysis of complex data types involving free text, graphics, and multimedia data.

Traditional approaches to similarity analysis that consider multiple different distance functions when determining similarity use a weighted sum of several relevant distances. This approach produces results that are highly dependent on the selected weights, meaning that it is important to select appropriate values for the individual weights. Therefore, the already complicated analysis of the data becomes even more complicated and prone to user bias, estimation errors and instabilities, and non-uniqueness of results.

U.S. patent application Ser. No. 13/680,417 filed on Nov. 19, 2012, invented by Urmanov and Bougaev, and assigned to the assignee of the present application provides a detailed description of tri-point arbitration. The '417 application is incorporated herein by reference in its entirety for all purposes. Tri-point arbitration addresses the problem of analyst bias in determining similarity. Rather than determining similarity by an external analyst, tri-point arbitration determines similarity with an internal arbiter that is representative of the data set itself. Thus, rather than expressing similarity based on distances between two points and forcing the analyst to determine a range of distances that is similar, tri-point arbitration uses three points to determine similarity, thereby replacing the external analyst with an internal arbiter point that represents the data set, i.e., introducing an internal analyst into similarity determination.

The present application describes a multi-distance extension of tri-point arbitration that allows for seamless combination of several distance functions for analysis of compound data. Thus, the systems and methods described herein address the problem of analyst bias in selecting distance functions and/or weighting of the distance functions to be used in similarity analysis. A brief overview of tri-point arbitration is next, which will be followed by a description of multi-distance tri-point arbitration.

Tri-Point Arbitration

Tri-point arbitration is realized through the introduction of an arbiter data point into the process of evaluation of the similarity of two or more data points. The term "data point" is used in the most generic sense and can represent points in a multidimensional metric space, images, sound and video streams, free texts, genome sequences, collections of structured or unstructured data of various types. Tri-point arbitration uncovers the intrinsic structure in a group of data points, facilitating inferences about the interrelationships among data points in a given data set or population. Tri-point arbitration has extensive application in the fields of data mining, machine learning, and related fields that in the past have relied on two point distance based similarity metrics.

Figure 1:
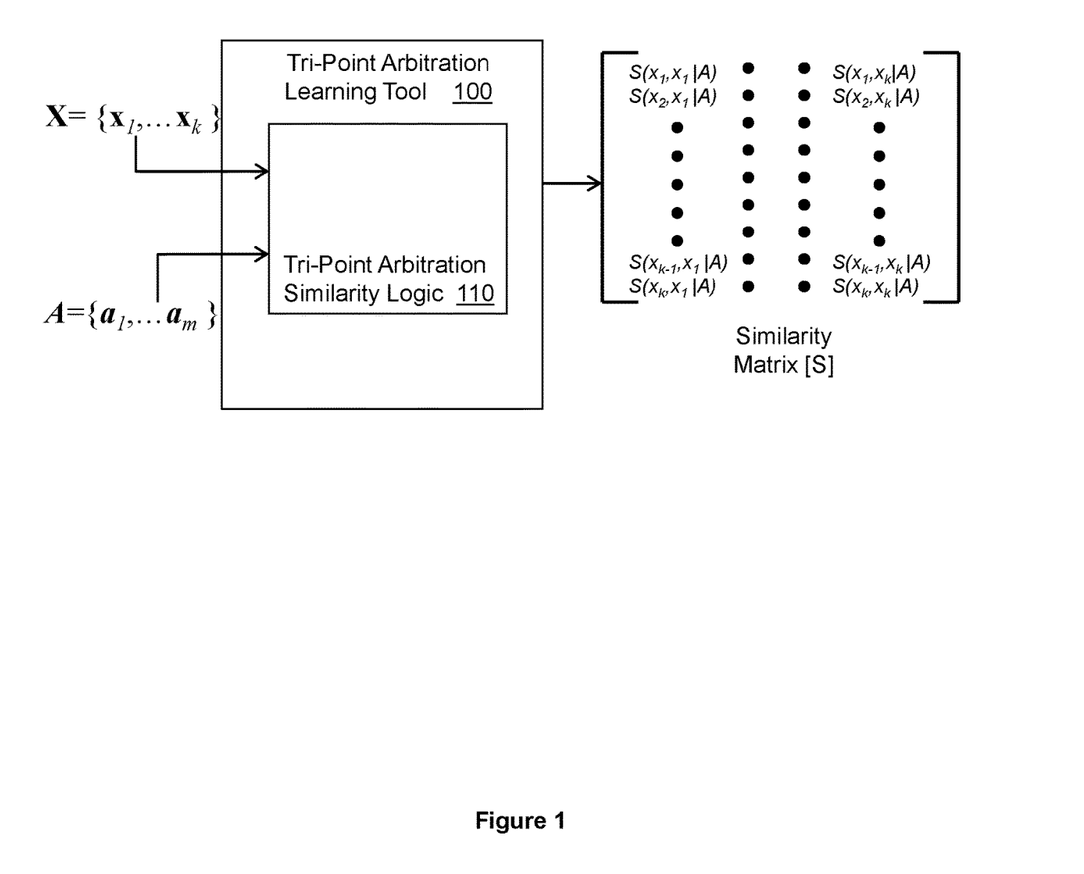
FIG. 1 illustrates an embodiment of a system associated with similarity analysis with tri-point data arbitration.

With reference to FIG. 1, one embodiment of a tri-point arbitration learning tool 100 that performs similarity analysis using tri-point arbitration is illustrated. The learning tool 100 inputs a data set X of k data points $\{x_1, \ldots, x_k\}$ and calculates a similarity matrix [S] using tri-point arbitration. The learning tool 100 includes a tri-point arbitration similarity logic 110. The tri-point arbitration logic 110 selects a data point pair $(x_1, x_2)$ from the data set. The tri-point arbitration logic 110 also selects an arbiter point $(a_1)$ from a set of arbiter points, A, that is representative of the data set. Various examples of sets of arbiter points will be described in more detail below. The tri-point arbitration logic 110 calculates a per-arbiter tri-point arbitration similarity for the data point pair based, at least in part, on a distance between the first and second data points and the selected arbiter point $a_1$.

Figure 2:
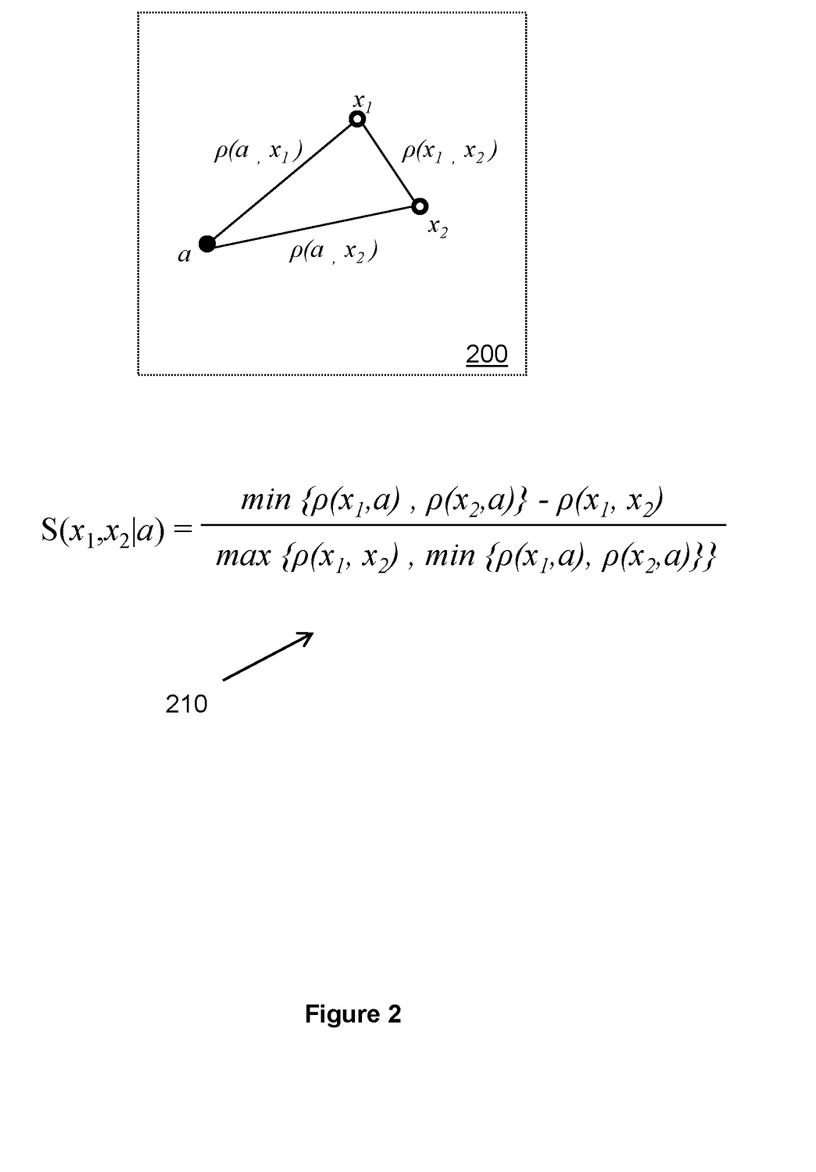
FIG. 2 illustrates an embodiment of a method associated with similarity analysis with tri-point data arbitration.

FIG. 2 illustrates one embodiment of a tri-point arbitration technique that may be used by the tri-point arbitration logic 110 to compute the per-arbiter tri-point arbitration similarity for a single data point pair. A plot 200 illustrates a spatial relationship between the data points in the data point pair $(x_1, x_2)$ and an arbiter point a. Recall that the data points and arbiter point will typically have many more dimensions than the two shown in the simple example plot 200. The data points and arbiter points may be points or sets in multi-dimensional metric spaces, time series, or other collections of temporal nature, free text descriptions, and various transformations of these. A tri-point arbitration similarity for data points $(x_1, x_2)$ with respect to arbiter point a is calculated as shown in 210, where ρ designates a two-point distance determined according to any appropriate distance function:

$$S(x_1, x_2 \mid a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}} \quad \text{EQ. 1}$$

Thus, the tri-point arbitration technique illustrated in FIG. 2 calculates the tri-point arbitration similarity based on a first distance between the first and second data points, a second distance between the arbiter point and the first data point, and a third distance between the arbiter point and the second data point.

Values for the per-arbiter tri-point arbitration similarity, $S(x_1, x_2|a)$, range from −1 to 1. In terms of similarities, $S(x_1, x_2)|a)$ is greater than 0 when both distances from the arbiter to either data point are greater than the distance between the data points. In this situation, the data points are closer to each other than to the arbiter. Thus a positive tri-point arbitration similarity indicates that the points are similar, and the magnitude of the positive similarity indicates a level of similarity. $S(x_1, x_2|a)$ equal to one indicates a highest level of similarity, where the two data points are coincident with one another.

In terms of dissimilarity, $S(x_1, x_2|a)$ is less than zero when the distance between the arbiter and one of the data points is less than the distance between the data points. In this situation, the arbiter is closer to one of the data points than the data points are to each other. Thus a negative tri-point arbitration similarity indicates dissimilarity, and the magnitude of the negative similarity indicates a level of dissimilarity. $S(x_1, x_2|a)$ equal to negative one indicates a complete dissimilarity between the data points, when the arbiter coincides with one of the data points.

A tri-point arbitration similarity equal to zero results when the arbiter and data points are equidistant from one another. Thus $S(x_1, x_2|a)=0$ indicates complete neutrality with respect to the arbiter point, meaning that the arbiter point cannot determine whether the points in the data point pair are similar or dissimilar.

Aggregating Per-Arbiter Tri-Point Similarities

Returning to FIG. 1, the tri-point arbitration similarity logic 110 calculates additional respective per-arbiter tri-point arbitration similarities for the data point pair $(x_1, x_2)$ based on respective arbiter points $(a_2\text{-}a_m)$ and combines the per-arbiter tri-point arbitration similarities for each data pair in a selected manner to create a tri-point arbitration similarity, denoted $S(x_1, x_2|A)$, for the data point pair. The tri-point arbitration logic 110 computes tri-point arbitration similarities for the other data point pairs in the data set. In this manner, the tri-point arbitration logic 110 determines a pair-wise similarity matrix [S], as illustrated in FIG. 1.

As already discussed above, the arbiter point(s) represent the data set rather than an external analyst. There are several ways in which a set of arbitration points may be selected to represent the data set. The set of arbiter points A may represent the data set based on an empirical observation of the data set. For example, the set of arbiter points may include all points in the data set. The set of arbiter points may include selected data points that are weighted when combined to reflect a contribution of the data point to the overall data set. The tri-point arbitration similarity calculated based on a set of arbitration points that are an empirical representation of the data set may be calculated as follows:

$$S(x_1, x_2 | A) = \frac{1}{m} \sum_{i=1}^{m} S(x_1, x_2 | a_i)$$

Variations of aggregation of arbiter points including various weighting schemes may be used. Other examples of aggregation may include majority/minority voting, computing median, and so on. For a known or estimated probability distribution of data points in the data set, the set of arbitration points corresponds to the probability distribution, f(a). The tri-point arbitration similarity can be calculated using an empirical observation of the data point values in the data set, an estimated distribution of the data point values in the data set, or an actual distribution of data point values in the data set. Using tri-point arbitration with an arbiter point that represents the data set yields more appealing and practical similarity results than using a traditional two point distance approach.

Per-Attribute Tri-Point Arbitration Similarity Analysis

In another embodiment that may be more suitable for data containing non-numeric attributes converted into numeric values, the arbiter and a pair of data points are compared in each attribute or dimension separately and then the results of the comparison for all arbiters in each dimension are combined to create an overall comparison. This approach is useful i) for non-numerical data, such as binary yes/no data or categorical data, ii) when the magnitude of the difference in a dimension doesn't matter, or iii) when some of the data attributes are more important than others. In this embodiment, the distances between attributes of the points and each given arbiter are not combined to compute per-arbiter similarities. Instead distances between attributes of the points and the arbiters are combined on a per attribute basis for all the arbiters to compute "per-attribute similarities." The per-attribute similarities for each arbiter are combined to compute the tri-point arbitration similarity S for the data point pair. U.S. patent application Ser. No. 13/833,757 filed on Mar. 15, 2013, invented by Urmanov, Wood, and Bougaev, and assigned to the assignee of the present application provides a detailed description of per-attribute tri-point arbitration. The '757 application is incorporated herein by reference in its entirety for all purposes.

Distances between attributes of different types may be computed differently. A per-attribute similarity is computed based on the distances, in the attribute, between the arbiters and each member of the pair of data points. The per-attribute similarity is a number between −1 and 1. If the arbiter is farther from both of the data points in the pair than the data points in the pair are from each other, then the pair of data points is similar to each other, for this attribute, from the point of view of the arbiter. Depending on the distances between the arbiter and the data points, the per-attribute similarity will be a positive number less than or equal to 1.

Otherwise, if the arbiter is closer to either of the data points in the pair than the data points are to each other, then the pair of data points is not similar to each other, for this attribute, from the point of view of the arbiter. Depending on the distances between the arbiter and the data points, the per-attribute similarity will be a negative number greater than or equal to −1.

Per-attribute distances can be combined in any number of ways to create the tri-point arbitration similarity. Per-attribute tri-point arbitration similarities can be weighted differently when combined to create the tri-point arbitration similarity. Per-attribute tri-point arbitration similarities for a selected subset of arbiters may be combined to create the tri-point arbitration similarity. For example, all per-attribute tri-point arbitration similarities for a given numeric attribute for all arbiters can be combined for a pair of points to create a first per-attribute similarity, all per-attribute tri-point arbitration similarities for a given binary attribute can be combined for the pair of points to create a second per-attribute similarity, and so on. The per-attribute similarities are combined to create the tri-point arbitration similarity for the data point pair.

In one embodiment, a proportion of per-attribute similarities that indicate similarity may be used as the tri-point arbitration similarity metric. For example, if two data points are similar in a 3 out of 5 attributes, then the data points may be assigned a the tri-point arbitration similarity metric of 3/5.

Returning to FIG. 1, the illustrated pair-wise similarity matrix [S] arranges the tri-point arbitration similarities for the data points in rows and columns where rows have a common first data point and columns have a common second data point. When searching for data points that are similar to a target data point within the data set, either the row or column for the target data point will contain tri-point arbitration similarities for the other data points with respect to the target data point. High positive similarities in either the target data point's row or column may be identified to determine the most similar data points to the target data point. Further, the [S] matrix can be used for any number of learning applications, including clustering and classification based on the traditional matrix of pair-wise distances. The matrix [S] may also be used as a proxy for similarity/dissimilarity of the pairs.

Multi-Distance Tri-Point Arbitration

Often datasets are produced by compound data-generating mechanisms, meaning that the variation in the data points is produced by variations in more than one factor. Hereinafter this type of dataset will be referred to as a compound dataset. For example, data corresponding to a dimension of an orifice in a series of manufactured parts being measured for quality control purposes may vary because of both an offset of the orifice within the part as well as variations in the shape of the orifice. Using a single distance function to determine similarities in the data will likely not be able to identify orifices as similar that are similar in both shape and offset. Rather a single distance function will typically only identify as similar orifices that are similar in either shape or offset.

Many different distance functions can be used in similarity analysis. Probably the most basic and easily understood distance function is the Euclidean distance, which corresponds to a length of a line segment drawn between two points. Another distance function is the Pearson Correlation distance. The Pearson Correlation is a measure of the linear correlation between two data points. The Pearson Correlation distance is based on this correlation. The Cosine distance function produces a distance between two data points that is based on an angle between a first vector from the origin to the first data point and a second vector from the origin to the second data point. Hundreds of other distance functions have been theorized, any of which is suitable for use in multi-distance tri-point arbitration.

For compound datasets, it is important to utilize more than one distance function when determining similarity. Consider the orifice example from above. If tri-point arbitration similarity is determined between orifices based only on a Euclidean distance, orifices having similar offsets will be determined to be similar to one another. However, the pairs of orifices determined to be similar will include pairs of orifices that have similar offset but non-similar shapes as well as pairs of orifices that have similar offset and similar shape. Likewise, if tri-point arbitration similarity is determined between orifices based only on a Pearson Correlation distance, orifices having similar shapes will be determined to be similar to one another. However, the pairs of orifices determined to be similar will include pairs of orifices that have similar shape but non-similar offsets as well as pairs of orifices that have similar shape and similar offset.

As discussed above, traditional similarity analysis techniques that consider distances produced by more than one distance function utilize weighting to combine the different distances. The selection of the weights as well as the different distance functions introduces analyst bias into similarity analysis. Multi-distance tri-point arbitration allows for seamless combination of several distance functions for analysis of compound data.

The present system executes multi-distance similarity analysis using tri-point arbitration in order to determine whether features of electronic communication are similar or dissimilar to known safe features or known malicious features. This is performed to classify the electronic communication as either safe/expect/normal electronic communication or malicious/anomalous electronic communication. In one embodiment, the electronic communication may correspond to an attempt by a remote computing device to access a service over a network. The features can correspond to a time at which the electronic communication was sent. Another feature can correspond to a location from which the electronic communication was sent. Yet other features can correspond to various device features, such as device type and IP address, of the remote computing device that sent the electronic communication.

These features are extracted from the electronic communication as data points. Multi-distance similarity analysis and tri-point arbitration are executed to determine how similar the data points are with data points of malicious features and/or data points of known safe feature. The known safe features may be features of electronic communications routinely received when the user account or service is accessed in a non-malicious manner and normal manner. If the features are more similar to the malicious features or more dissimilar to the known safe features, then the electronic communication is labeled as anomalous/malicious and is blocked. The electronic communication can be blocked by modifying operation of computers and/or networking equipment to block the electronic communication. If the features are more similar to the known safe features or more dissimilar from the malicious features, then the electronic communication is labeled as safe and is allowed. In this way, account security and service access security is improved.

Figure 3:
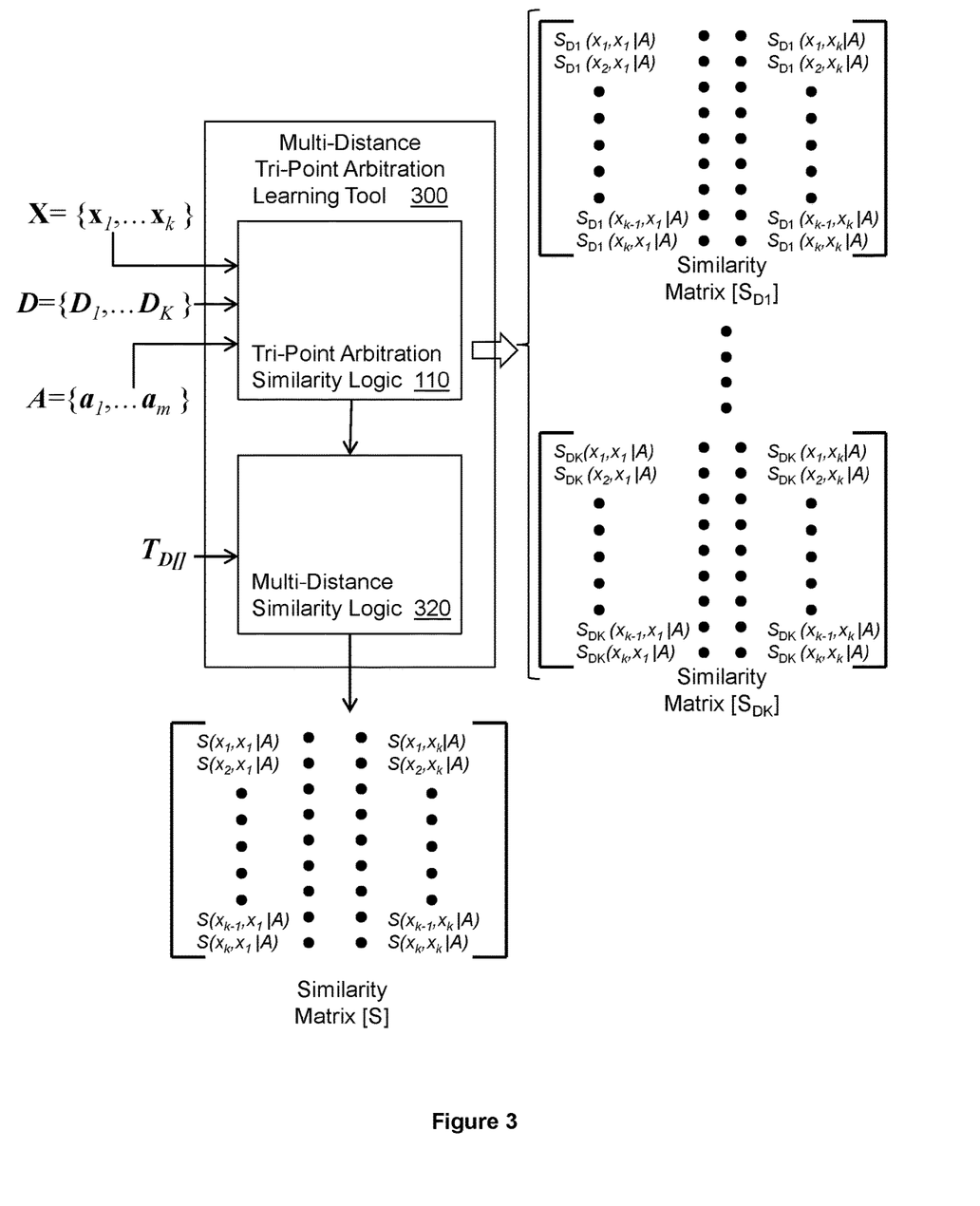
FIG. 3 illustrates results of one embodiment of a system associated with similarity analysis with multi-distance tri-point data arbitration.

FIG. 3 illustrates one example embodiment of a multi-distance tri-point arbitration learning tool 300. The learning tool 300 includes the tri-point arbitration similarity logic 110 of FIG. 1 and multi-distance similarity logic 320. The tri-point arbitration similarity logic 110 inputs a data set X having k data points $\{x_1, \ldots, x_k\}$ and a set A having m arbiter points $\{a_1, \ldots, a_m\}$. The tri-point arbitration similarity logic 110 also inputs a set D having K distance functions $\{D_1, \ldots, D_K\}$. For example, one of the distance functions could be Euclidean distance, another distance function could be Cosine distance, and so on. For each distance function, the tri-point arbitration similarity logic 110 calculates a per-distance similarity for each data point pair in X using the set of arbiter points A and the given distance function as described above with respect to FIG. 1.

Recall that any number of aggregation functions can be used to combine the per-arbiter similarities for a given data point pair and given distance function. Further, as also discussed above, per-attribute similarities may be computed for each arbiter and a pair of data points and these per-arbiter per-attribute similarities can then be combined to create the tri-point arbitration similarity. The resulting per-distance similarities for each data point pair populate a per-distance similarity matrix $[S_D]$ for each distance function, resulting in K per distance similarity matrices $[S_{D1}]-[S_{DK}]$.

The multi-distance logic 320 inputs a rule set $T_{D[\ ]}$ that specifies how to combine per-distance tri-point arbitration similarities $S_{D1}-S_{DK}$ for a data point pair into a single multi-distance tri-point similarity S for the data point pair. In one embodiment, the rules combine $S_{D1}-S_{DK}$ as follows. If a dominant number of the per-distance tri-point arbitration similarities $S_{D1}-S_{DK}$ for a data point pair indicate that the data points are similar, S will be determined to indicate similarity. If a dominant number of the per-distance tri-point arbitration similarities $S_{D1}-S_{DK}$ for a data point pair indicate that the data points are dissimilar, S will be determined to indicate dissimilarity.

In one particular embodiment, the rule set $T_{D[\ ]}$ set forth above is evaluated iteratively such that the multi-distance tri-point similarity S for a data point pair is successively adjusted based on each per-distance tri-point arbitration similarity SD for the data point pair considered in turn. Note that the per-distance tri-point arbitration similarities $S_{D1}-S_{DK}$ are readily obtained by reference to the K per distance similarity matrices $[S_{D1}]-[S_{DK}]$. Recall that similarity values range from −1 to 1, with −1 corresponding to total dissimilarity, 0 corresponding to neutrality, and +1 corresponding to total similarity. The rule set $T_{D[\ ]}$ is as follows:

If $S>=0$ and $S_D>=0$, Then $S=S+S_D-(S*S_D)$     1.

This rule has the effect of increasing the level of similarity indicated by S when both the multi-distance tri-point similarity S and the per-distance tri-point arbitration similarity $S_D$ under consideration in the present iteration indicate that the data points are similar.

If $S<=0$ and $S_D<=0$, Then $S=S+S_D+(S*S_D)$     2.

This rule has the effect of increasing the level of dissimilarity indicated by S when both the multi-distance tri-point similarity S and the per-distance tri-point arbitration similarity $S_D$ under consideration in the present iteration indicate that the data points are dissimilar.

If $S<=0$ and $S_D>=0$ OR $S>=0$ and $S_D<=0$, Then
$S=S+S_D/(1-\min(abs(S),abs(S_D)))$     3.

This rule has the effect of adjusting the level of similarity indicated by S toward neutral when one of the multi-distance tri-point similarity S and the per-distance tri-point arbitration similarity $S_D$ indicates that the data points are similar and the other indicates that the data points are dissimilar.

After the rule set is applied to a current value of S and $S_D$ to calculate a new value for S, the rule set is applied to the new S and the next $S_D$, and so on, until all $S_D$ have been considered. The final value for S is returned as the multi-distance tri-point similarity S for the data point pair. Application of the rule set above will result in a multi-distance tri-point similarity S equal to 1 when all of the $S_D$ indicate total similarity, a multi-distance tri-point similarity S equal to −1 when all of the $S_D$ indicate total dissimilarity, and a multi-distance tri-point similarity S equal to 0 when all of the $S_D$ indicate complete neutrality.

Figure 4:
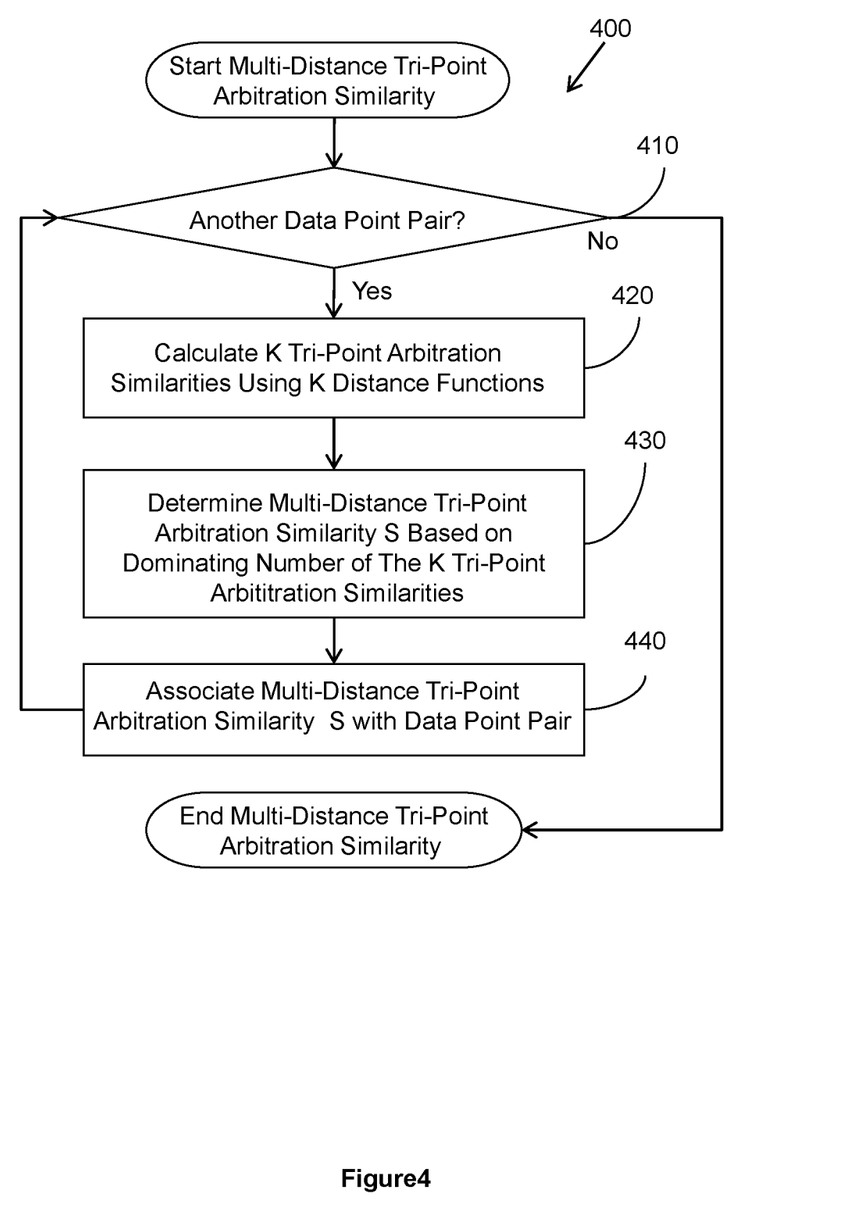
FIG. 4 illustrates an embodiment of a method associated with similarity analysis using multi-distance tri-point data arbitration.

FIG. 4 illustrates one embodiment of a method 400 for performing multi-distance tri-point arbitration. The method 400 may be performed by the multi-distance tri-point arbitration learning tool 300 of FIG. 3. The method includes, at 410, determining whether another data point pair remains for similarity analysis. If not, the method ends. When an unanalyzed data point pair remains, the method includes, at 420, using a K different distance functions D1-DK, calculating K per-distance tri-point arbitration similarities SD1-SDK between the pair of data points xi and xj with respect to an arbiter point a.

The method includes, at 430, computing a multi-distance tri-point arbitration similarity S between the data points based on a dominating number of the K per-distance tri-point arbitration similarities. Thus, the method determines that the data points are similar when a dominating number of the K per-distance tri-point arbitration similarities indicate that the data points are similar. The method determines that the data points are dissimilar when a dominating number of the K per-distance tri-point arbitration similarities indicate that the data points are dissimilar. At 440, the method includes associating the multi-distance tri-point arbitration similarity with the data points for use in future processing.

As can be seen from the foregoing description, the multi-distance tri-point arbitration disclosed herein is capable of performing similarity analysis of datasets produced by compound data-generating mechanisms. A plurality of distance functions can be combined in a non-trivial way to perform similarity analysis without any additional parameter tuning (e.g., weight selection). The results produced by multi-distance tri-point arbitration are superior to results obtained using a single distance function for compound data sets and are also competitive for non-compound datasets. Multi-distance tri-point arbitration can be used in a wide spectrum of data-mining applications such as health, e-commerce, insurance, retail, social networks, monitoring, security enhancement, analytics, and so on.

Security Enhancement Using Multi-Distance Similarity Analysis with Tri-Point Arbitration In one embodiment, multi-distance similarity analysis using tri-point arbitration is used to improve security of online services, storage environments, cloud computing environments, multi-tenant environments, and/or other computing environments. Such techniques can be implemented by a security module, such as hardware and/or software, configured to execute instructions for performing various computed implemented actions to modify operation of computing devices to improve security.

Data points, analyzed using tripoint arbitration to determine similarity between data points, can relate to information associated with entities, such as computing devices, users, user accounts, etc. In one embodiment, a data point can correspond to information relating to a computing device attempting to access a user account with an online service, such as an email service, a banking service, an online shopping service, etc. The information can comprise a location of the computing device, an IP address of the computing device, device information of the computing device (e.g., a MAC address, a device type, a manufacturer, a model, etc.), a time of day when the attempt was made, etc. Such information can be extracted as features from electronic communications, received over a network, attempting to access the user account of the online service.

The data points, such as features extracted from electronic communications, can be analyzed using multi-distance similarity analysis and tripoint arbitration to detect an anomaly data point indicative of a computing device attempting to perform a malicious activity. The malicious activity can relate to the using of compromised credentials to gain unauthorized access to the user account with the online service. The malicious activity can relate to one or more computing devices, such as bots executing on the computing devices, performing a security attack.

A data point is determined by multi-distance similarity analysis and tripoint arbitration to be an anomaly data point when the data point is dissimilar from known data points. The anomaly data point represents malicious activity because a feature represented by the anomaly data point is dissimilar from expected features of non-malicious activities or is similar to known malicious features. That is, the data point represents a feature of the electronic communication, such as a location of a device that sent the electronic communication in an attempt to access the user account. The data point is compared to known data points of known locations of devices that routinely access the user account to perform non-malicious activities (e.g., locations from which an owner of the user account generally accesses the user account). If the data point, representing the location of the device, is dissimilar beyond a threshold amount from the known locations, then the data point is identified as the anomaly data point indicative of malicious activity, such as a malicious user attempting to access the user account from a strange location different from the known locations.

The security module can perform various actions to improve security upon detecting an anomaly data point representing malicious activity by a computing device. In one embodiment, the security module blocks further attempts by the computing device to access the online service. For example, the security module modifies a setting within a server or network device (e.g., a router, a gateway, etc.) to modify operation of the server or network device to block communication packets or authentication attempts received from the computing device. In this way, operation of the server or network device is modified in order to improve security against malicious computing devices.

In another embodiment, the security module modifies the user account to force the owner of the user account to reset an account password of the user account. In this way, the user account is protected against malicious attempts to access the user account. In another embodiment, the security module modifies the user account by implementing additional authentication verification or to change to a different type of authentication verification. This can force multifactor authentication for subsequent attempts by computing devices to access the user account.

In another embodiment, the security module modifies a setting within the server or network device to block an IP address of the computing device. The IP address is a feature from the electronic communication that is represented by the anomaly data point. A state of a network firewall implemented by the server or network device can be modified to block network communication from the IP address of the computing device.

In another embodiment where the anomaly data point is indicative of a security attack, the security module modifies a setting within the server or network device to change an IP address used by the online service. The security module can also modify a setting within the server or network device to block a port used by the online service.

In one embodiment of utilizing multi-distance similarity analysis and tripoint arbitration to improve security of an online service from a malicious device, an electronic communication is received by a computing device. The computing device, such as a server or network device, may implement the security module. The electronic communication is parsed to identify user account credentials, such as an email address and password, and an online service address of the online service. The electronic communication is stored in an unscored communications pool within memory of the computing device. The unscored communications pool may be isolated from a blocked communications pool and an allowed communication pool stored within the memory of the computing device. Once electronic communications are determined to be safe or malicious, then such electronic communications are transferred from the unscored communications pool to either the blocked communications pool or the allowed communications pool.

The electronic communication is evaluated to extract features as data points that are evaluated using multi-distance similarity analysis and tripoint arbitration to identify an anomaly data point indicative of the electronic communication being a malicious attack or a malicious attempt to gain unauthorized access to the user account. The anomaly data point is identified as a data point having one or more features that are dissimilar from known expected features or similar to known malicious features. In one embodiment, the anomaly data point is identified where a data point representing a current location of a device that sent the electronic communication deviates a threshold amount from locations of devices routinely used to by the owner to access the user account in non-malicious ways. For example, the anomaly data point represents an attempt to access the user account from a foreign country, whereas the owner of the user account usually accesses the user account from home, such as within the last 20 minutes. In another embodiment, the anomaly data point is identified where an IP address of the device that sent the electronic communication deviates a threshold amount from IP addresses of devices routinely used to access the user account. In yet another embodiment, the anomaly data point is identified where device characteristics (e.g., a device model, a MAC address, a device type, etc.) of the device that sent the electronic communication deviates a threshold amount from device characteristics of devices routinely used to access the user account.

Detection of the anomaly data point is performed using multi-distance similarity analysis and tripoint arbitration and a set of known data points representing features of electronic communications routinely used to non-maliciously access the user account, such as IP addresses, device characteristics, times of access, device locations, etc. In this way, a wide variety of features can be used as data points for detecting anomaly data points indicative of malicious activity. If the anomaly data point is identified, then computerized actions can be taken upon the electronic communication and/or to modify operation of a computing device such as a server or network device associated with the online service. Such actions can comprise blocking further communication from the device by modifying settings within the server and/or network device. The settings can be modified by transmitting an instruction over a network to the server and/or network device to modify a setting, such as a setting to block a port, a setting to block communication from an IP address, a firewall setting, etc.

In one embodiment, the user identification, such as an email address, is extracted from the electronic communication. An account verification is performed to identify the existence of the user account. Features of the electronic communication such as a current location, device information, device IP address, and/or other features are extracted as data points for tripoint arbitration analysis. A modified electronic communication is created by appending the data points and account verification results to the electronic communication.

The modified electronic communication is scored to create a scored electronic communication. In one embodiment of scoring, recent user authentication behavior data is retrieved, such as from a database or other data structure within which user authentication behavior data is stored. The user authentication behavior data may comprise device login IP address data, device login location data, login times, device information, and/or other authentication behavior associated with the owner of the user account authenticating and accessing the user account for non-malicious activity. The recent user authentication behavior data is appended to the modified electronic communication. The recent user authentication behavior data can be used by tripoint anomaly detection as known data points of non-malicious behavior of the owner of the account. The modified electronic communication is scanned to determine whether the modified electronic communication is malicious communication by executing tripoint anomaly detection. The tripoint anomaly detection can use the recent user authentication behavior data as know data points to compare with data points of the features extracted from the electronic communication to determine similarity/dissimilarity between such for anomaly detection. If tripoint anomaly detection determines that one or more data points of features extracted from the modified electronic communication are anomaly data points, then the modified electronic communication is flagged as a malicious communication. Detecting malicious communication can be performed for other electronic communications received by the online service. Scores are assigned to modified electronic communications based upon how similar features of the modified electronic communications are to known expected behavior of the owner.

Figure 5:
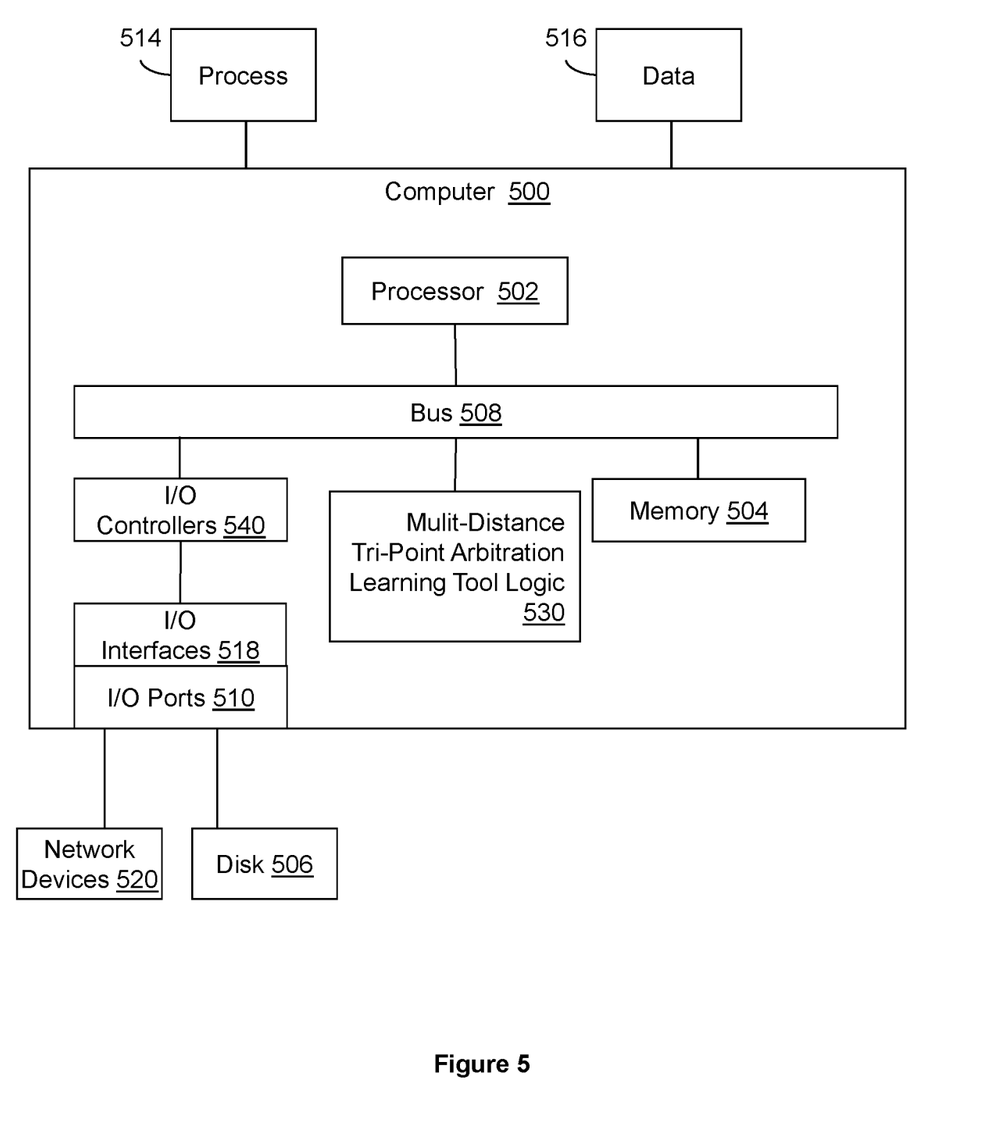
FIG. 5 illustrates an embodiment of a computing system in which example systems and methods, and equivalents, may operate.

A new data file can be created by copying the modified electronic communication and a score into a new data file as a scored communication file. The scored communication file is transferred into a scored communications pool. Once scored communication files are created from electronic communications within the unscored communications pool and are transferred to the scored communications pool, remaining data within the unscored communications pool is deleted. Scores of the scored communication files within the scored communications pool are evaluated to determine whether such scored communication files are to be moved into the blocked communications pool or the allowed communications pool. If a score of a scored communication file exceeds a threshold indicative of malicious communication, then the scored communication file is moved to the blocked communications pool. Otherwise, the scored communications file is moved to the allowed communications pool. Scored communication files within the blocked communications pool are blocked from accessing the user account and/or from being normally processed by the online service. Scored communication files within the allowed communications pool are allowed to access the user account and/or are processed normally by the online service General Computer Embodiment FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a multi-distance tri-point arbitration learning tool logic 530 configured to facilitate similarity analysis using multi-distance tri-point arbitration. In different examples, the multi-distance tri-point arbitration learning tool 530 may be implemented in hardware, a non-transitory computer-readable medium with stored instructions, firmware, and/or combinations thereof. While the multi-distance tri-point arbitration learning tool logic 530 is illustrated as a hardware component attached to the bus 508, it is to be appreciated that in one example, the multi-distance tri-point arbitration learning tool learning logic 530 could be implemented in the processor 502.

In one embodiment, multi-distance learning logic 530 is a means (e.g., hardware, non-transitory computer-readable medium, firmware) for performing similarity analysis using multi-distance tri-point arbitration.

The means may be implemented, for example, as an ASIC programmed to perform multi-distance tri-point arbitration. The means may also be implemented as stored computer executable instructions that are presented to computer 500 as data 516 that are temporarily stored in memory 504 and then executed by processor 502.

Multi-distance tri-point arbitration learning tool learning logic 530 may also provide means (e.g., hardware, non-transitory computer-readable medium that stores executable instructions, firmware) for performing the methods illustrated in FIGS. 1-4.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

An "electronic data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing computer-executable instructions that when executed by a computer cause the computer to perform corresponding functions, the functions comprising:

using a K different distance functions $D_1$-$D_K$, calculating K per-distance tri-point arbitration similarities $S_{D1}$-$S_{DK}$ between a pair of data points $x_i$ and $x_j$ with respect to an arbiter point a, wherein the data point $x_i$ corresponds to a feature extracted from an electronic communication attempting to access a service and the data point $x_j$ corresponds to a known feature;

computing a multi-distance tri-point arbitration similarity S between the data points by:
    determining that the data points are similar when a dominating number of the K per-distance tri-point arbitration similarities indicate that the data points are similar; and
    determining that the data points are dissimilar when a dominating number of the K per-distance tri-point arbitration similarities indicate that the data points are dissimilar;
associating the multi-distance tri-point arbitration similarity with the data points; and
executing an action to block the electronic communication from accessing the service based upon whether the multi-distance tri-point arbitration similarity indicates that the data point $x_i$ is similar or dissimilar to the data point $x_j$.

2. The non-transitory computer storage medium of claim 1, where the function for executing the action to block the electronic communication comprises:
    executing an instruction to modify a setting within a computing device hosting the service to block the electronic communication.

3. The non-transitory computer storage medium of claim 1, where the function for executing the action to block the electronic communication comprises:
    executing an instruction to modify a firewall setting within a computing device hosting the service to block communication from a device that sent the electronic communication.

4. The non-transitory computer storage medium of claim 1, where the functions comprise calculating each of the K per-distance tri-point arbitration similarities $S_{D1}$-$S_{DK}$ by:
    calculating a plurality of per-arbiter tri-point arbitration similarities between the pair of data points $x_i$ and $x_j$ with respect to a respective plurality of arbiter points; and
    combining the per-arbiter tri-point arbitration similarities to calculate the tri-point arbitration similarity $S_D$ for the pair of data points.

5. The non-transitory computer storage medium of claim 1, where the function for executing the action to block the electronic communication comprises:
    executing an instruction to block a user account of the service to which the electronic communication was requesting access.

6. The non-transitory computer storage medium of claim 1, where the function for executing the action to block the electronic communication comprises:
    executing an instruction to modify a user account of the service to which the electronic communication was requesting access, wherein the modification changes an authentication mechanism used to authenticate with the service for access to the user account.

7. The non-transitory computer storage medium of claim 1, where the functions comprise computing the per-distance tri-point similarity between points $x_1$ and $x_2$ with respect to arbiter a based on the following relationship, where $\rho$ is the distance between points using the respective distance function:

$$S_D(x_1, x_2 \mid a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}}.$$

8. A computing system, comprising:
a processor;
tri-point arbitration similarity logic configured to cause the processor to calculate K per-distance tri-point arbitration similarities $S_{D1}$-$S_{DK}$ between a pair of data points $x_i$ and $x_j$ with respect to an arbiter point a using K different distance functions $D_1$-$D_K$, wherein the data point $x_i$ corresponds to a feature extracted from an electronic communication attempting to access a service and the data point $x_j$ corresponds to a known feature; and
multi-distance logic configured to cause the processor to:
    compute a multi-distance tri-point arbitration similarity S between the data points by:
        determining that the data points are similar when a dominating number of the K per-distance tri-point arbitration similarities indicate that the data points are similar; and
        determining that the data points are dissimilar when a dominating number of the K per-distance tri-point arbitration similarities indicate that the data points are dissimilar;
    store, in computer storage media, the multi-distance tri-point arbitration similarity for the data points for use in future processing; and
    execute an action to block the electronic communication from accessing the service based upon whether the multi-distance tri-point arbitration similarity indicates that the data point $x_i$ is similar or dissimilar to the data point $x_j$.

9. The computing system of claim 8, where the multi-distance tri-point arbitration logic is configured to cause the processor to compute the multi-distance tri-point similarity by:
    selecting a first per-distance tri-point arbitration similarity $S_{D1}$ from the K tri-point arbitration similarities;
    assigning a value of $S_{D1}$ to the multi-distance tri-point arbitration similarity S; and
    until all of the K per-distance tri-point arbitration similarities have been considered;
        selecting, in turn, a next per-distance tri-point arbitration similarity $S_{Dn}$ from the K tri-point arbitration similarities; and
        adjusting S based on a comparison between S and $S_{Dn}$.

10. The computing system of claim 8, where the value of S has a range between a first value indicating maximum dissimilarity to a second value indicating maximum similarity, where a third value for S corresponding to a midpoint of the range indicates neutrality, and further where the multi-distance tri-point arbitration logic is configured to cause the processor to adjust S based on the comparison between S and $S_{Dn}$ by:
    when S and $S_{Dn}$ both indicate that the data points are similar, adjusting S so that S is closer to the first value;
    when S and $S_{Dn}$ both indicate that the data points are dissimilar, adjusting S so that S is closer to the second value; and
    when one of S and $S_{Dn}$ indicates that the data points are similar and the other one of S and $S_{Dn}$ indicates that the data points are dissimilar, adjusting S so that S is closer to the third value.

11. The computing system of claim 8, where the multi-distance tri-point arbitration logic is configured to cause the processor to calculate each of the K per-distance tri-point arbitration similarities $S_{D1}$-$S_{DK}$ by:

calculating a plurality of per-arbiter tri-point arbitration similarities between the pair of data points $x_i$ and $x_j$ with respect to a respective plurality of arbiter points; and combining the per-arbiter tri-point arbitration similarities to calculate the tri-point arbitration similarity $S_D$ for the pair of data points.

12. The computing system of claim 11, where the data points and arbiter point each comprise a plurality of attributes, and where the multi-distance tri-point arbitration logic is configured to cause the processor to calculate each of the K per-distance tri-point arbitration similarities $S_{D1}$-$S_{DK}$ by:

for each arbiter point, calculating a per-arbiter and per-attribute tri-point arbitration similarity between the pair of data points $x_i$ and $x_j$ with respect to the arbiter point, for each of the plurality of attributes; and combining the per-arbiter and per-attribute tri-point arbitration similarities for each of the respective attributes to calculate a set of respective per-attribute tri-point arbitration similarities for the pair of data points, combining the per-attribute tri-point arbitration similarities to calculate the tri-point arbitration similarity $S_D$ for the pair of data points.

13. The computing system of claim 8, where the multi-distance tri-point arbitration logic is configured to cause the processor to compute the per-distance tri-point similarity between points $x_1$ and $x_2$ with respect to arbiter a based on the following relationship, where $\rho$ is the distance between points using the respective distance function:

$$S_D(x_1, x_2 \mid a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}}.$$

14. A computer-implemented method, comprising, with a processor:

using a K different distance functions $S_{D1}$-$D_K$, calculating K per-distance tri-point arbitration similarities $S_{D1}$-$D_K$ between a pair of data points $x_i$ and $x_j$ with respect to an arbiter point a, wherein the data point $x_i$ corresponds to a feature extracted from an electronic communication attempting to access a service and the data point $x_j$ corresponds to a known feature;

computing a multi-distance tri-point arbitration similarity S between the data points by:

determining that the data points are similar when a dominating number of the K per-distance tri-point arbitration similarities indicate that the data points are similar; and determining that the data points are dissimilar when a dominating number of the K per-distance tri-point arbitration similarities indicate that the data points are dissimilar;

storing, in computer storage media, the multi-distance tri-point arbitration similarity for the data points for use in future processing; and executing an action to block the electronic communication from accessing the service based upon whether the multi-distance tri-point arbitration similarity indicates that the data point $x_i$ is similar or dissimilar to the data point $x_j$.

15. The computer-implemented method of claim 14, comprising computing the multi-distance tri-point similarity by:

selecting a first per-distance tri-point arbitration similarity $S_{D1}$ from the K tri-point arbitration similarities;

assigning a value of $S_{D1}$ to the multi-distance tri-point arbitration similarity S; and until all of the K per-distance tri-point arbitration similarities have been considered;

selecting, in turn, a next per-distance tri-point arbitration similarity $S_{Dn}$ from the K tri-point arbitration similarities; and adjusting S based on a comparison between S and $S_{Dn}$.

16. The computer-implemented method of claim 14, where the value of S has a range between a first value indicating maximum dissimilarity to a second value indicating maximum similarity, where a third value for S corresponding to a midpoint of the range indicates neutrality, and further where adjusting S based on the comparison between S and $S_{Dn}$ comprises:

when S and $S_{Dn}$ both indicate that the data points are similar, adjusting S so that S is closer to the first value;

when S and $S_{Dn}$ both indicate that the data points are dissimilar, adjusting S so that S is closer to the second value; and when one of S and $S_{Dn}$ indicates that the data points are similar and the other one of S and $S_{Dn}$ indicates that the data points are dissimilar, adjusting S so that S is closer to the third value.

17. The computer-implemented method of claim 14, comprising calculating each of the K per-distance tri-point arbitration similarities $S_{D1}$-$S_{DK}$ by:

calculating a plurality of per-arbiter tri-point arbitration similarities between the pair of data points $x_i$ and $x_j$ with respect to a respective plurality of arbiter points; and combining the per-arbiter tri-point arbitration similarities to calculate the tri-point arbitration similarity $S_D$ for the pair of data points.

18. The computer-implemented method of claim 17, where the data points and arbiter point each comprise a plurality of attributes, and where calculating each of the K per-distance tri-point arbitration similarities $S_{D1}$-$S_{DK}$ comprises:

for each arbiter point, calculating a per-arbiter and per-attribute tri-point arbitration similarity between the pair of data points $x_i$ and $x_j$ with respect to the arbiter point, for each of the plurality of attributes; and combining the per-arbiter and per-attribute tri-point arbitration similarities for each of the respective attributes to calculate a set of respective per-attribute tri-point arbitration similarities for the pair of data points;

combining the per-attribute tri-point arbitration similarities to calculate the tri-point arbitration similarity $S_D$ for the pair of data points.

19. The computer-implemented method of claim 14, where the distance functions $D_1$-$D_K$ comprise one or more of: Euclidean, Pearson Correlation, and Cosine.

20. The computer-implemented method of claim 14, comprising computing the per-distance tri-point similarity between points $x_i$ and $x_2$ with respect to arbiter a based on the following relationship, where $\rho$ is the distance between points using the respective distance function:

$$S_D(x_1, x_2 \mid a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}}.$$

* * * * *

UNITED STATES PATENT AND TRADEMARK OFFICE
CERTIFICATE OF CORRECTION

PATENT NO. : 11,409,770 B2
APPLICATION NO. : 16/059336
DATED : August 9, 2022
INVENTOR(S) : Urmanov et al.

It is certified that error appears in the above-identified patent and that said Letters Patent is hereby corrected as shown below:

In the Drawings

On sheet 4 of 5, in Figure 4, under Reference Numeral 430, Line 4, delete "Arbititration" and insert -- Arbitration --, therefor.

On sheet 4 of 5, in Figure 4, Line 20, delete "Figure4" and insert -- Figure 4 --, therefor.

On sheet 5 of 5, in Figure 5, under Reference Numeral 530, Line 1, delete "Mulit" and insert -- Multi --, therefor.

In the Specification

In Column 4, Line 10, delete "$(x_1, x_2)$" and insert -- $(x_1, x_2)$ --, therefor.

In Column 4, Line 34, delete "$X_2)|a)$" and insert -- $X_2|a)$ --, therefor.

In Column 6, Line 30, delete "a the" and insert -- the --, therefor.

In Column 8, Line 45, delete "SD" and insert -- $S_D$ --, therefor.

In Column 13, Line 8, delete "service" and insert -- service. --, therefor.

In the Claims

In Column 18, Line 8, in Claim 8, delete "xi" and insert -- $x_i$ --, therefor.

In Column 19, Line 39, in Claim 14, delete "$S_{D1}-D_K$," and insert -- $D_1-D_K$, --, therefor.

Signed and Sealed this
Twenty-seventh Day of December, 2022

*Katherine Kelly Vidal*

Katherine Kelly Vidal
*Director of the United States Patent and Trademark Office*

CERTIFICATE OF CORRECTION (continued)
U.S. Pat. No. 11,409,770 B2

In Column 19, Line 40, in Claim 14, delete "$S_{D1}-D_K$" and insert -- $S_{D1}-S_{DK}$ --, therefor.

In Column 20, Line 58, in Claim 20, delete "$x_i$" and insert -- $x_1$ --, therefor.